US011925954B2

(12) United States Patent
Prather et al.

(10) Patent No.: US 11,925,954 B2
(45) Date of Patent: Mar. 12, 2024

(54) FLASH NOZZLE ASSEMBLY

(71) Applicant: Capsugel Belgium NV, Bornem (BE)

(72) Inventors: Cody Prather, Bend, OR (US); Randy Ham, Bend, OR (US); John Dugan, Bend, OR (US)

(73) Assignee: Capsugel Belgium NV (BE)

( * ) Notice: Subject to any disclaimer, the term of this patent is extended or adjusted under 35 U.S.C. 154(b) by 0 days.

(21) Appl. No.: 17/775,008

(22) PCT Filed: Nov. 5, 2020

(86) PCT No.: PCT/IB2020/060429
§ 371 (c)(1),
(2) Date: May 6, 2022

(87) PCT Pub. No.: WO2021/090238
PCT Pub. Date: May 14, 2021

(65) Prior Publication Data

US 2022/0362789 A1 Nov. 17, 2022

Related U.S. Application Data

(60) Provisional application No. 62/933,156, filed on Nov. 8, 2019.

(51) Int. Cl.

| | |
|---|---|
| ***B05B 7/06*** | (2006.01) |
| ***B05B 7/10*** | (2006.01) |
| ***F26B 3/12*** | (2006.01) |
| *F26B 21/14* | (2006.01) |

(52) U.S. Cl.
CPC ................ *B05B 7/066* (2013.01); *B05B 7/10* (2013.01); *F26B 3/12* (2013.01); *F26B 21/14* (2013.01)

(58) Field of Classification Search
CPC ... B05B 7/066; B05B 7/10; F26B 3/12; F26B 21/14
USPC ........................................................ 239/424
See application file for complete search history.

(56) References Cited

U.S. PATENT DOCUMENTS

| | | | |
|---|---|---|---|
| 5,067,657 | A | 11/1991 | Young et al. |
| 6,264,113 | B1 | 7/2001 | Dingler |
| 8,939,388 | B1 | 1/2015 | Beetz et al. |

FOREIGN PATENT DOCUMENTS

| | | | |
|---|---|---|---|
| EP | 0 621 079 | A1 | 10/1994 |

OTHER PUBLICATIONS

International Search Report and Written Opinion, dated Feb. 18, 2021, issued for International Patent Application No. PCT/IB2020/060429, 13 pages.

*Primary Examiner* — Christopher S Kim
(74) *Attorney, Agent, or Firm* — Klarquist Sparkman, LLP

(57) ABSTRACT

A nozzle assembly includes a nozzle, a manifold, and wand body. The nozzle, manifold, and wand body can be coupled together to provide a robust spray drying system that can withstand elevated temperature and/or pressure feed stock. In some embodiments, an internal shoulder portion of the manifold can engage with a side of a nozzle collar to restrict distal movement of the nozzle relative to the manifold.

21 Claims, 9 Drawing Sheets

FLASH NOZZLE ASSEMBLY

CROSS REFERENCE TO RELATED APPLICATION

This application claims the benefit of earlier filed U.S. Provisional Application No. 62/933,156, filed on Nov. 8, 2019, which is incorporated by reference herein in its entirety.

FIELD

The systems and methods disclosed herein are directed to spray drying systems and methods.

BACKGROUND

Spray drying systems can be used to produce powders from feed stocks for applications that vary from powdered milk to bulk chemicals and pharmaceuticals. Spray drying at elevated temperatures can be desirable to provided improved spray formulations, such as improved homogeneity, more uniform particle size, and/or increasing the product throughput by enhancing the solubility of the drug. However, the elevated temperatures and/or pressures of the feed stock can introduce significant design challenges and, as such, improvements in spray drying systems that are capable of operating at elevated temperatures are desirable.

SUMMARY

Various embodiments of spray drying systems, including nozzle assemblies are disclosed herein.

In one embodiment, a nozzle assembly is provided that comprises a nozzle, a manifold, and wand body. The nozzle can have a nozzle distal end, a nozzle proximal end, a nozzle collar located between the nozzle distal end and the nozzle proximal end, first central passageway, a nozzle distal portion extending from a first side of the nozzle collar to the nozzle distal end, and a nozzle proximal portion extending from a second side of the nozzle collar to the nozzle proximal end. The manifold has a manifold distal end, a manifold proximal end, a second central passageway through which the nozzle is received, at least one manifold sweep gas passageway, and an internal shoulder portion that engages with the first side of the nozzle collar to restrict distal movement of the nozzle relative to the manifold. The wand body has a wand body distal end, a wand body proximal end, an inner tube with a groove in an enlarged portion of the inner tube at the wand body distal end, and at least one wand body sweep gas passageway. A sealing member (e.g., an O-ring) can be positioned in the groove of the inner tube and at least a portion of the nozzle proximal portion can extend into the inner tube of the wand body with the sealing member forming a radial seal between an outer surface of the nozzle proximal portion and the inner tube of the wand body. In some embodiments, the nozzle proximal end can be chamfered.

In other embodiments, a gland end can be provided with a proximal portion that extends into the enlarged portion of the inner tube and a distal portion that engages with the second side of the nozzle collar to restrict proximal movement of the nozzle relative to the wand body. A biasing member (e.g., a spring washer) can be positioned between the distal portion of the gland end and the second side of the nozzle collar to bias the first side of the nozzle collar against the internal shoulder portion of the manifold.

In some embodiments, an air cap can be provided with a proximal opening, a distal opening, and an air-cap passageway that tapers from the proximal opening to the distal opening. The distal nozzle portion can extend through the air-cap passageway and the distal opening of the air cap can be flush with the nozzle distal end. In other embodiments, the distal nozzle portion can be recessed relative to the distal opening of the air cap or, in yet other embodiments, the distal nozzle portion can extend beyond the distal opening of the air cap.

In yet other embodiments, the nozzle assembly can include a swirl insert positioned between the manifold and air cap. The swirl insert can include a nozzle passageway through which the nozzle extends and one or more additional passageways for receiving a sweep gas. The one or more additional passageways can be formed at an angle relative to the nozzle passageway.

In some embodiments, the air cap can be sized to be receive the swirl insert within the proximal opening. An air cap nut can be provided to extend over the air cap to secure the air cap to the distal end of the manifold. The manifold can include a manifold collar, and the manifold proximal end can extend into the wand body so that the manifold proximal end surrounds a portion of the inner tube of the wand body and a proximal side of the manifold collar engages with a distal surface of the wand body. A sealing member can be received in a groove adjacent the proximal side of the manifold collar.

In some embodiments, a centering disk with a central opening and one or more slots radially outward of the central opening can be provided. The centering disk can be secured to the inner tube with the inner tube positioned in the central opening. The second central passageway can be defined by an interior surface of the manifold that extends from the internal should portion of the manifold to an air-channel connection 254 within the manifold, the length of the interior surface of the manifold being at least 20%, 30%, or 40% of a length of the portion of the nozzle that extends from the nozzle collar to the air shroud. The air-channel connection can comprise a cylindrical groove cutout.

In another embodiment, a nozzle assembly comprises a nozzle, a wand body, a sealing member (e.g., an O-ring), and a gland end. The nozzle can have a nozzle distal end, a nozzle proximal end, a nozzle collar located between the distal end and the proximal end, first central passageway, a nozzle distal portion extending from a first side of the nozzle collar to the nozzle distal end, and a nozzle proximal portion extending from a second side of the nozzle collar to the nozzle proximal end. A wand body can have a wand body distal end, a wand body proximal end, an inner tube with a groove in an enlarged portion of the inner tube at the wand body distal end, and at least one wand body sweep gas passageway. The sealing member can be positioned in the groove of the inner tube and at least a portion of the nozzle proximal portion extending through the sealing member into the inner tube of the wand body. The gland end can have a proximal portion that extends into the enlarged portion of the inner tube and a distal portion that engages with the second side of the nozzle collar to restrict proximal movement of the nozzle relative to the wand body.

In some embodiments, nozzle proximal end can be chamfered. A biasing member can be positioned between the distal portion of the gland end and the second side of the nozzle collar to bias the first side of the nozzle collar away from the wand body.

In other embodiments, a manifold also be provided with a manifold distal end, a manifold proximal end, a second central passageway through which the nozzle is received, at least one manifold sweep gas passageway, and an internal shoulder portion that engages with the first side of the nozzle collar to restrict distal movement of the nozzle relative to the manifold. An air cap, a swirl insert, and an air cap nut can also be provided. having a proximal opening, a distal opening, and an air-cap passageway that tapers from the proximal opening to the distal opening;

In yet another embodiment, a spray drying system can be provided that includes a drying chamber, a nozzle assembly as described above and positioned within the drying chamber, and an air-liquid manifold coupled to the nozzle assembly.

The foregoing and other objects, features, and advantages of the invention will become more apparent from the following detailed description, which proceeds with reference to the accompanying figures.

DETAILED DESCRIPTION

General Considerations

Figure 1:
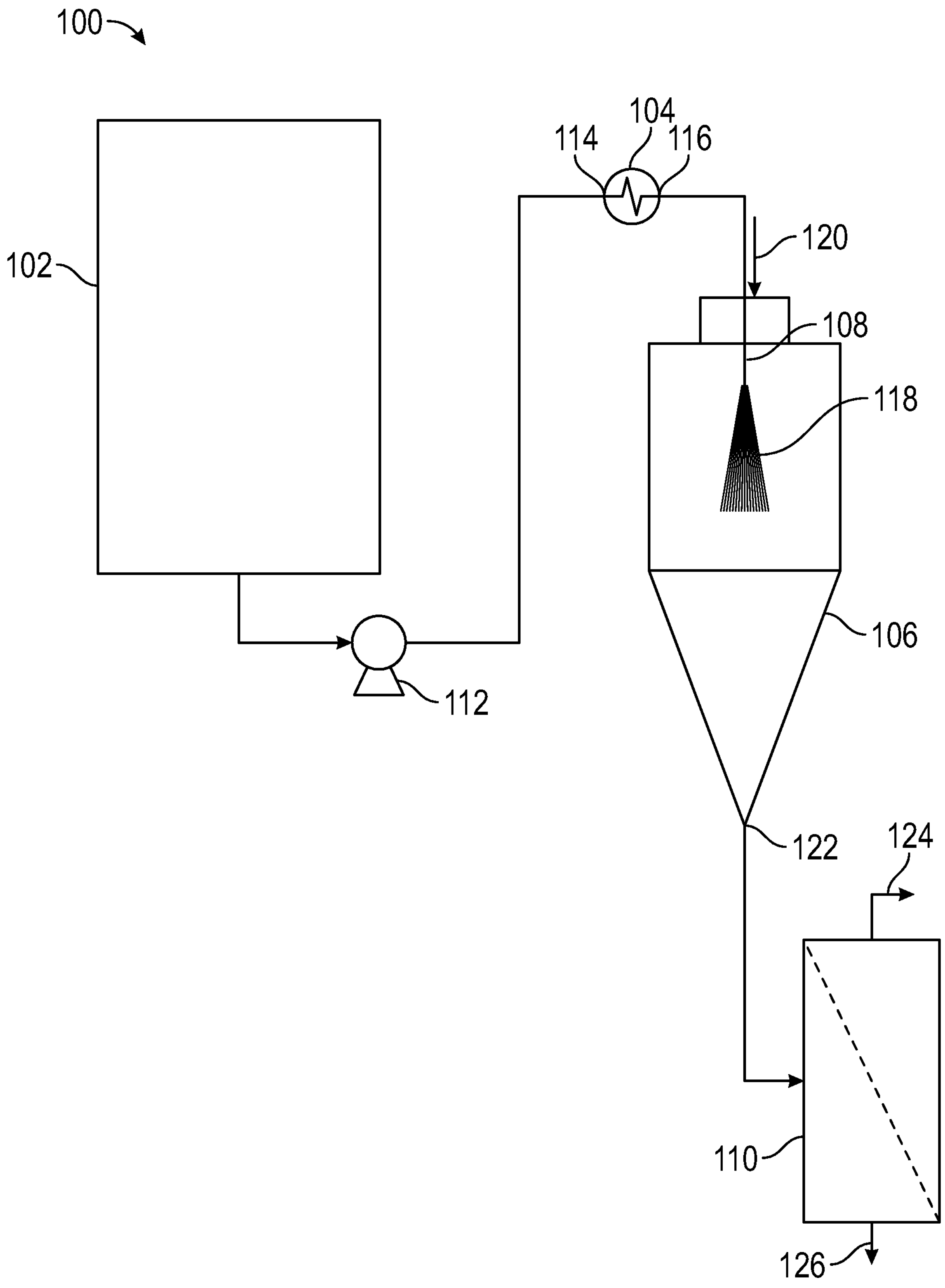
FIG. 1 is a schematic diagram of a spray drying apparatus and system.

As used in this application the singular forms “a,” “an,” and “the” include the plural forms unless the context clearly dictates otherwise. Additionally, the term “includes” means “comprises.” Furthermore, as used herein, the term “and/or” means any one item or combination of items in the phrase. In addition, the term “exemplary” means serving as a non-limiting example, instance, or illustration. As used herein, the terms “e.g.,” and “for example,” introduce a list of one or more non-limiting embodiments, examples, instances, and/or illustrations.

Unless otherwise indicated, all numbers expressing quantities of components, molecular weights, percentages, temperatures, times, and so forth, as used in the specification or claims are to be understood as being modified by the term “about.” Accordingly, unless otherwise indicated, implicitly or explicitly, the numerical parameters set forth are approximations that may depend on the desired properties sought and/or limits of detection under standard test conditions/methods. When directly and explicitly distinguishing embodiments from discussed prior art, the embodiment numbers are not approximates unless the word “about” is recited.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed things and methods can be used in conjunction with other things and methods. Additionally, the description sometimes uses terms like “provide,” “produce,” “determine,” and “select” to describe the disclosed methods. These terms are high-level descriptions of the actual operations that are performed. The actual operations that correspond to these terms will vary depending on the particular implementation and are readily discernible by one of ordinary skill in the art having the benefit of this disclosure.

The systems and methods described herein, and individual components thereof, should not be construed as being limited to the particular uses or systems described herein in any way. Instead, this disclosure is directed toward all novel and non-obvious features and aspects of the various disclosed embodiments, alone and in various combinations and subcombinations with one another. For example, any features or aspects of the disclosed embodiments can be used in various combinations and subcombinations with one another, as will be recognized by an ordinarily skilled artisan in the relevant field(s) in view of the information disclosed herein. In addition, the disclosed systems, methods, and components thereof are not limited to any specific aspect or feature or combinations thereof, nor do the disclosed things and methods require that any one or more specific advantages be present or problems be solved.

Spray Drying Systems and Methods

As used herein, the term “spray drying” refers to processes involving breaking up liquid mixtures into small droplets (e.g., atomization) and rapidly removing solvent from the mixture (e.g., drying) in a container (e.g., a drying chamber) where there is a strong driving force for evaporation of solvent from the droplets. The strong driving force for solvent evaporation is generally provided by maintaining the partial pressure of solvent in the spray-drying apparatus well below the vapor pressure of the solvent at the temperature of the drying droplets. This can be accomplished, for example, by mixing the liquid droplets with a warm drying gas, maintaining the pressure in the spray-drying apparatus at a partial vacuum (e.g., 0.01 atm to 0.50 atm), or both.

Turning to the drawings, FIG. 1 illustrates an apparatus 100 suitable for performing embodiments of the disclosed processes. In the following discussion, the spray-drying apparatus is described as being cylindrical. However, the dryer may take any other cross-sectional shape suitable for spray drying a spray solution, including square, rectangular, and octagonal, among others. The spray-drying apparatus is also depicted as having one nozzle. However, multiple nozzles can be included in the spray-drying apparatus to achieve higher throughput of the spray solution.

The apparatus 100 includes a feed suspension tank 102, a heat exchanger 104, a drying chamber 106, a nozzle 108, and a particle-collection means 110. In one embodiment, at least one solute is combined with a solvent in the feed suspension tank 102 to form a feed suspension. The feed suspension is at a temperature T1, which is below the ambient-pressure boiling point of the solvent. Temperature T1 is also below TS, the temperature at which the solute solubility equals the solute concentration in the solvent. When the solute comprises more than one solute, temperature T1 is below the temperature at which at least one solute's solubility equals that solute's concentration in the solvent. At least a portion of the solute is suspended, that is not dissolved, in the solvent. If desired, one or more mixing means can be provided to keep the feed suspension homogeneous while processing. If the solvent is flammable, oxygen can be excluded from the process. For example, an inert gas, such as nitrogen, helium, argon, and the like, can be used to fill the void space in the feed suspension tank for safety reasons.

Generally, the temperature and flow rate of the drying gas is chosen so that the droplets of spray solution are dry enough by the time they reach the wall of the apparatus that they are essentially solid, form a fine powder, and do not stick to the apparatus wall. The actual length of time to achieve this level of dryness depends on the size of the droplets and the conditions at which the process is operated. Droplet sizes may range from 1 μm to 500 μm in diameter, the size being dependent on the desired particle size of the spray dried powder. The large surface-to-volume ratio of the droplets and the large driving force for evaporation of solvent lead to actual drying times of a few seconds or less, and often less than 0.1 second. Solidification times should be less than 100 seconds, and often less than a few seconds.

For convenience, the feed suspension can be maintained at near-ambient temperatures; however, this is not a limitation of the disclosed processes. Generally, the temperature of the feed suspension, T1, can range from 0° C. to 50° C. or even higher. Temperatures of less than 0° C. may also be utilized, especially when there are stability concerns about the solute.

The feed suspension in the feed suspension tank 102 is delivered to a pump 112, which directs the feed suspension to the heat exchanger 104. The heat exchanger can have a feed suspension inlet 114, a spray solution outlet 116, a heating fluid inlet and outlet (not shown). The feed suspension enters the heat exchanger 104 through the feed suspension inlet 114 at temperature T1, and exits as the spray solution through the spray solution outlet 116 at temperature T2, which is greater than the feed suspension temperature T1.

In one embodiment, T1 is greater than or equal to TS, the temperature at which the solute solubility equals the solute concentration in the solvent at equilibrium. One of ordinary skill will understand that several factors affect dissolution of a solute in a solvent, including the solute particle size, the flow conditions of the suspension, and the residence time of the solute particles in the solvent at TS. In the following discussion, TS is the temperature at which the solute concentration in the solvent is equal to the solubility of the solute in the solvent at temperature TS when at equilibrium (i.e., when the solute concentration has no net change over time). In one embodiment, when T1 is greater than or equal to TS, the solute, at equilibrium, is essentially completely dissolved in the solvent and the spray solution is not a suspension at T1. By "essentially completely dissolved" is meant that less than 5 wt % of the solute remains undissolved. If the solute comprises an active agent and an excipient, T1 is selected such that the active agent is essentially completely dissolved in the solvent at T1, while the excipient may be dissolved, dispersed, or highly swollen in the solvent such that it acts as if it were dissolved. In these embodiments, feed suspension tank 102 can be considered to a spray solution tank, and feed suspension inlet 114 can be considered to be a spray solution inlet.

To prevent unwanted vaporization/boiling of the solvent in the spray solution, pump 112 can be configured to increase the pressure of the spray solution such that the pressure of the spray solution at spray solution outlet 116 is greater than the vapor pressure of the solvent at temperature T2. In one embodiment, the pump 24 increases the pressure of the spray solution to a pressure ranging from 2 atm to 400 atm. In another embodiment, the pressure of the spray solution as it exits the heat exchanger 30 is greater than 10 atm. The temperature of the spray solution when it enters the nozzle 108 can be generally the same as T2. Preferably, it is within 30° C. of temperature T2.

In one embodiment, the spray solution temperature T2 is greater than the ambient-pressure boiling point of the solvent. In one embodiment, T2 is less than TS, and the spray solution is a suspension at T2.

In another embodiment, the spray solution exiting the heat exchanger may be at any temperature, T2, which is greater than T1, as long as T2 is greater than or equal to TS. In one embodiment, when T2 is greater than or equal to TS, the solute is essentially completely dissolved in the solvent, and the spray solution is not a suspension at T2. When it is the object of the process to form a solid amorphous dispersion of an active agent and an excipient, T2 is greater than or equal to the temperature at which the active agent solubility at equilibrium equals the active agent concentration in the solvent (that is, TS). In such an embodiment, T2 preferably is at least 10° C. greater than TS. Temperature T2 may be at least 10° C. greater than T1, at least 20° C. greater than T1, at least 30° C. greater than Tl, at least 40° C. greater than T1, or even at least 50° C. greater than T1. In one embodiment, temperature T2 is at least 50° C. In another embodiment, temperature T2 is at least 70° C. In another embodiment, temperature T2 is at least 80° C. In another embodiment, temperature T2 is at least 90° C. In another embodiment, T2 is at least 100° C. In still another embodiment, T2 is at least 120° C.

The heat exchanger 114 may be of any design wherein heat is transferred to the feed suspension resulting in an increase in temperature. In one embodiment, the heat exchanger 114 is an indirect heat exchanger, wherein a heating fluid is in contact with the feed suspension through a heat-transfer surface. Exemplary indirect heat exchangers include tube-in-tube devices and tube-in-shell devices, both well-known in the art. The heat exchanger 114 may also be a direct heat exchanger, in which a heating fluid, such as steam, is injected directly into the feed suspension, resulting in an increase in the temperature of the feed suspension. In yet another embodiment, the feed suspension flows over a hot surface, such as a resistance heating element, resulting in an increase in temperature of the feed suspension. Other heating sources may also be used, such as microwaves and ultrasonic devices that can increase the temperature of the feed suspension.

The residence time of the feed suspension in the heat exchanger 114 can be minimized so as to limit the time the suspension/solution is exposed to elevated temperatures. The residence time of the suspension/solution in the heat exchanger may be less than 30 minutes, less than 20 minutes, less than 10 minutes, less than 5 minutes, or less than 1 minute.

The spray solution at the spray solution outlet 116 is directed to a drying chamber 106, where it enters a nozzle 108 for atomizing the spray solution into droplets 118. The temperature of the spray solution when it enters the nozzle 108 is the spray temperature, designated as T3. In one embodiment, T3 is less than or equal to T2. When it is desired to keep the solute essentially completely dissolved in the spray solution (i.e., T2 is greater than TS), it is often desirable for T3 to be at or near T2. However, there are sometimes advantages to having T3 significantly less than T2. For example, degradation of the solute may be reduced or atomization in certain nozzles may be more effective when T3 is significantly less than T2. In some cases, it is even desirable for T3 to be sufficiently low that the solute is not essentially completely dissolved in the solvent. In such cases, the solution may be below the point at which the solutes are essentially completely dissolved for a sufficiently short time such that all the solutes remain dissolved until the solution is atomized. Alternatively, the solution may be below the point at which the solutes are essentially completely dissolved for a sufficiently long time that one or more of the solutes may precipitate or crystallize from solution. In one embodiment, temperature T3 is less than 5° C. less than T2. In another embodiment, temperature T3 is less than 20° C. less than T2. In another embodiment, temperature T3 is less than 50° C. less than T2. In still another embodiment, both temperatures T2 and T3 are greater than TS. In one embodiment, temperatures T2 and T3 are at least 5° C. greater than TS. In another embodiment, temperatures T2 and T3 are at least 20° C. greater than TS. In yet another embodiment, temperatures T2 and T3 are at least 50° C. greater than TS.

In one embodiment, the apparatus 100 can be configured such that the time the spray solution is at a temperature greater than T3 is minimized. This may be accomplished by locating the spray solution outlet 116 as close as possible to the nozzle 108. Alternatively, the size of the tubing or fluid connections between the spray solution outlet 116 and the nozzle 108 may be small, minimizing the volume of spray solution and reducing the time the spray solution is at a temperature greater than T3. The time the spray solution is at a temperature greater than T3 may be less than 30 minutes, less than 20 minutes, less than 10 minutes, less than 5 minutes, or even less than 1 minute.

A heated drying gas 120 can be delivered into the drying chamber with the droplets 118. The drying gas may be virtually any gas, but to minimize the risk of fire or explosions due to ignition of flammable vapors, and to minimize undesirable oxidation of the solute, an inert gas such as nitrogen, nitrogen-enriched air, helium, or argon is utilized. The temperature of the heated drying gas at the inlet of the drying chamber can be between from 20° to 300° C.

In the drying chamber 106, at least a portion of the solvent is removed from the droplets to form a plurality of particles comprising the solute. Generally, it is desired that the droplets are sufficiently dry by the time they come in contact with the drying chamber surface that they do not stick or coat the chamber surfaces.

The particles, along with the evaporated solvent and drying gas, exit the drying chamber at outlet 122, and are directed to a particle-collection means 110. Suitable particle-collection means include cyclones, filters, electrostatic particle collectors, and the like. In the particle-collection means 110, the evaporated solvent/drying gas 124 is separated from a plurality of particles 126, allowing for collection of the particles.

Exemplary Nozzle Systems and Methods of Using the Same

Figure 2:
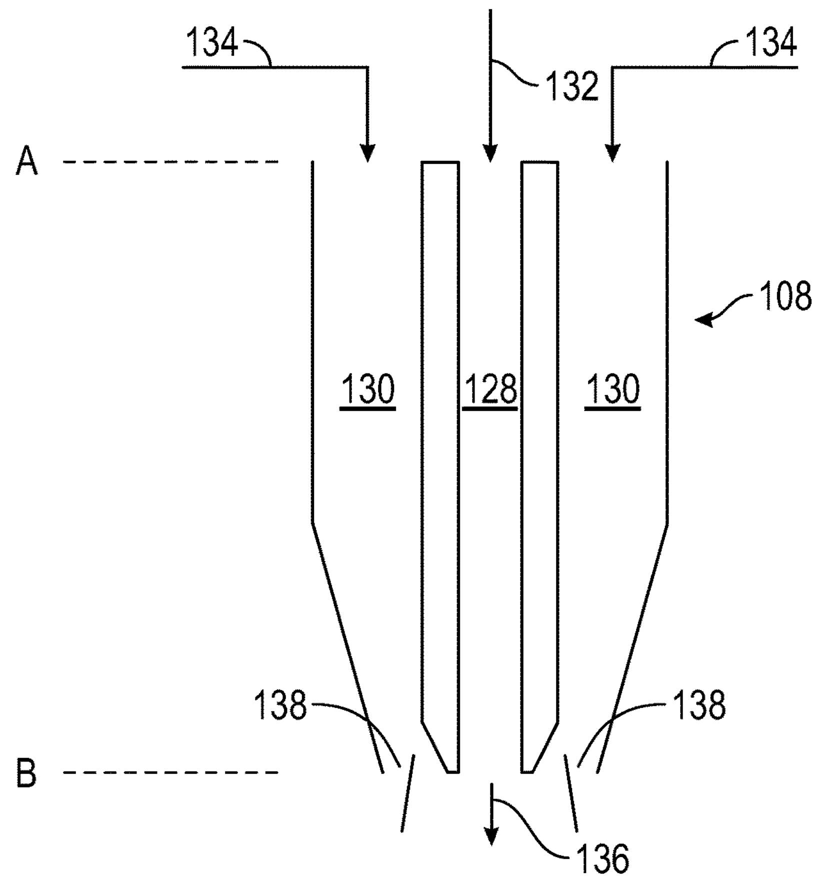
FIG. 2 shows a schematic illustration of a portion of an exemplary flash nozzle assembly.

FIG. 2 shows a schematic illustration of an exemplary flash nozzle assembly 108. Flash nozzle assembly 108 a central passageway 128 and an outer passageway 130. Central passageway 128 is in fluid communication with an inflowing spray solution 132 and outer passageway 130 is in fluid communication with a sweep gas 134. The sweep gas may be any suitable gas, such as, for example, nitrogen, nitrogen-enriched air, helium, or argon. In some embodiments, the sweep gas 134 is the same as the drying gas 120. In other embodiments, the sweep gas can have a different composition than the drying gas. The temperature and flow rate of the sweep gas can depend, at least in part, on the desired operating variables, e.g., T3, spray solution flow rate, etc.

The flash nozzle 108 a has an inlet end, represented by A, and an outlet end, represented by B. The spray solution 132 from the heat exchanger (shown in FIG. 1) can enter central passageway 128 at A and the sweep gas 134 can enter outer passageway 130 at A. As the spray solution 132 travels through the central passageway 128 from inlet A to outlet B, the pressure within central passageway can decrease due to a pressure drop. One of ordinary skill will understand that the amount of pressure drop in the flash nozzle will be a function several factors, including the length of the central passageway, the diameter of the central passageway, the flow rate of the spray solution, and the viscosity of the spray solution. The pressure of the spray solution when it exits the flash nozzle as droplets (at outlet B) will be the pressure in the spray drying chamber. Between inlet A and outlet B, the pressure of the spray solution can decrease to a value that is less than the vapor pressure of the solvent in the spray solution, leading to the formation of vapor bubbles of the solvent (e.g., by boiling and/or flash evaporation). By the time the spray solution 132 exits outlet B of the central passageway 128, it is a fluid 136 comprising droplets of spray solution and vapor-phase solvent.

The sweep gas 134 exiting through the outer passageway outlet 138 is in fluid communication with the fluid 136 exiting through the central passageway 128. The sweep gas 134 decreases the likelihood that solid material will form at the exit of the central or outer passageways. Additionally, the flowrate of the sweep gas can be used as a source for controlling secondary atomization of the exiting drops.

Figure 3:
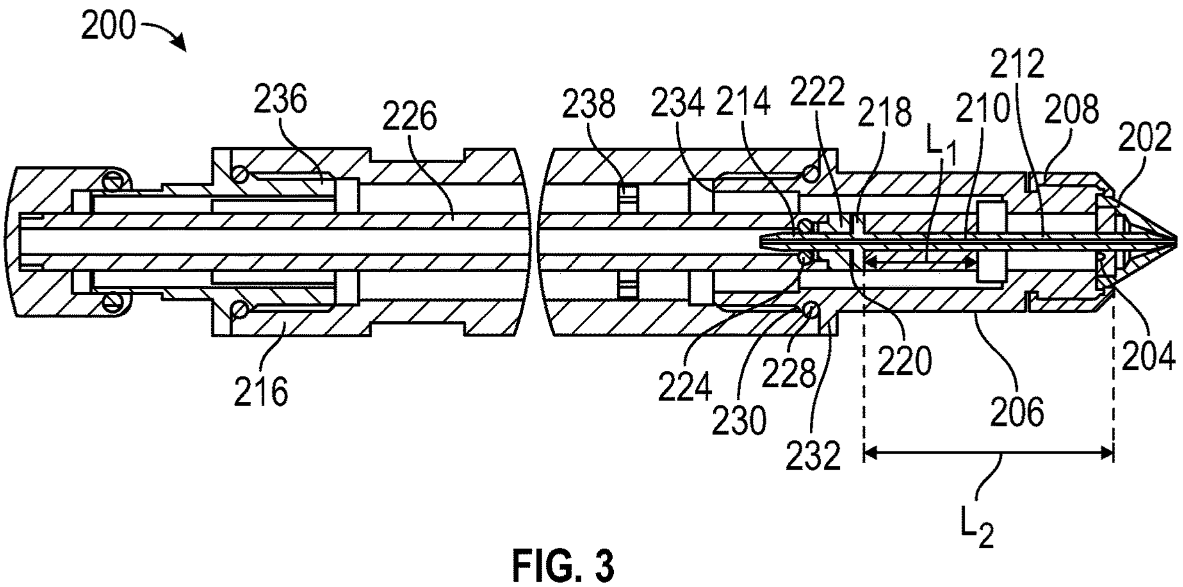
FIG. 3 is an illustration of an exemplary flash nozzle assembly.

FIG. 3 illustrates a flash nozzle assembly 200. Flash nozzle assembly 200 includes an air shroud 202 and a swirl insert 204 that are secured onto an end of a manifold 206 using a shroud nut 208. A nozzle 210 is positioned within the manifold 206. The nozzle 210 has a first end 212 that extends through the air shroud 202 and a second end 214 that extends into an inner tube in a wand body 216, with the first end 212 and second end 214 being separated by a nozzle collar 218.

Figure 4A:
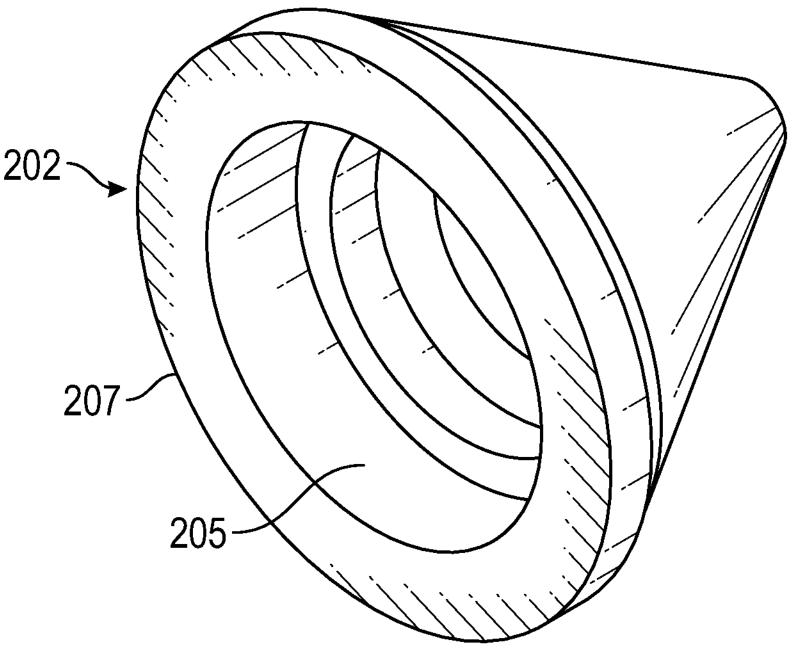
FIGS. 4A and 4B illustrate an exemplary air shroud of a flash nozzle assembly.
Figure 4B:
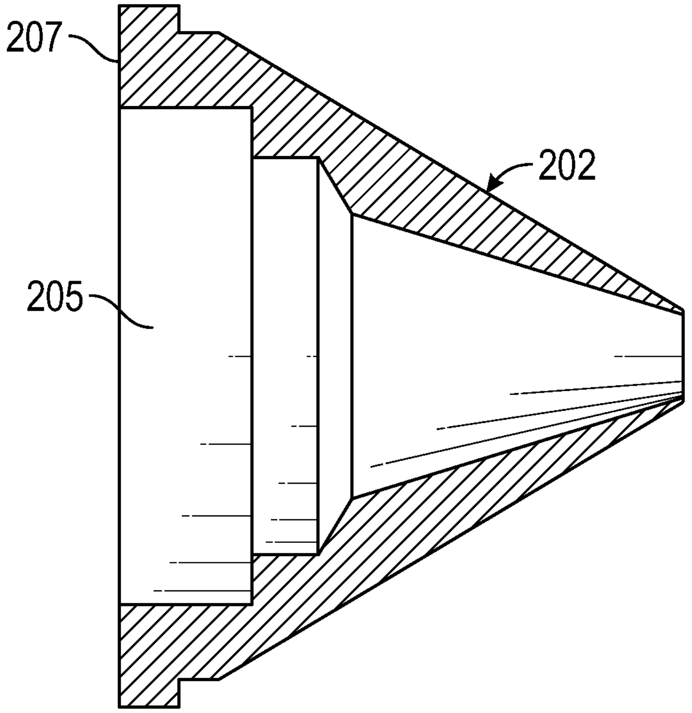
Figure 5A:
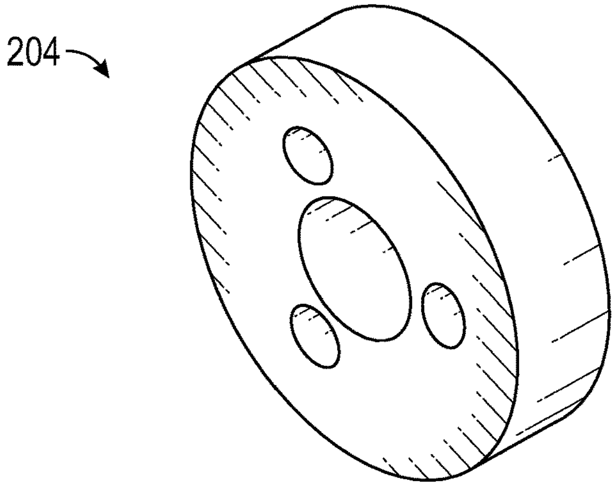
FIGS. 5A, 5B, and 5C illustrate an exemplary swirl insert of a flash nozzle assembly.
Figure 5B:
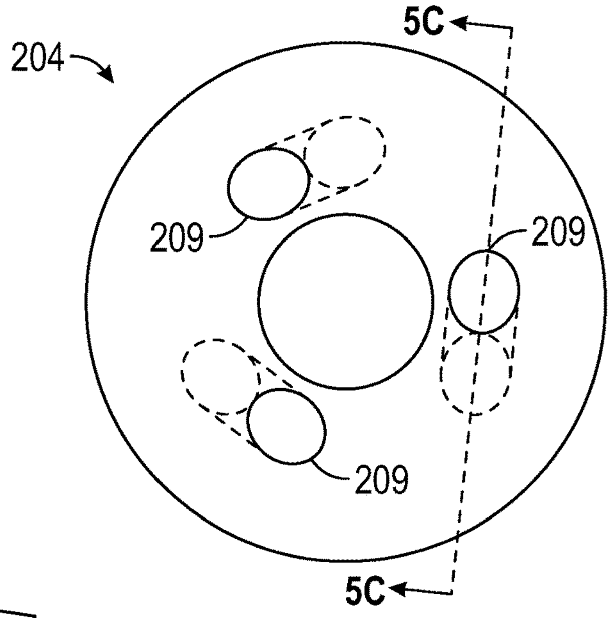
Figure 5C:
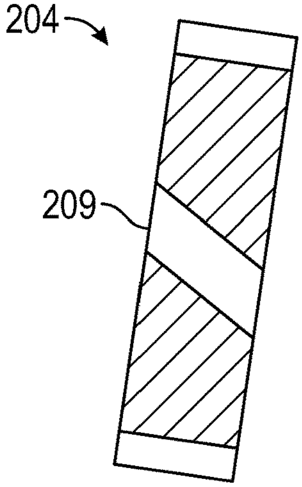

FIGS. 4A and 4B show an exemplary air shroud 202 and FIGS. 5A, 5B, and 5C show an exemplary swirl insert 204. As shown in FIG. 3, swirl insert 204 can be at least partially received within an internal area of the air shroud. FIGS. 4A and 4B show a recessed region 205 at a first end 207 of the air shroud which can be sized to receive the swirl insert 204.

As shown in FIGS. 5A, 5B, and 5C, the swirl insert 204 can comprise a central opening through which the nozzle 210 can extend and one or more one or more openings 209 that circumferentially surround the opening through which the sweep gas can pass. As shown in FIGS. 5B and 5C, each of the openings 209 can extend at an angle from a first end to a second end of the swirl insert 204 to provide a rotational component to the sweep gas as it passes from the first end to the second end of the swirl insert 204. In some embodiments, instead of a separate component, the swirl insert can be integrated with the air shroud.

Referring again to FIG. 3, the second end 214 of nozzle 210 receives a biasing member 220 (e.g., a spring washer) and a gland end 222. A temperature- and solvent-resistant sealing member 224 (e.g., a Kalrez® O-ring) can be positioned over the nozzle 210 and received in a gland of an inner tube 226 of the wand body 216. The second end 214 of the nozzle 210 can be chamfered to reduce the risk of O-ring damage and simplify assembly by making it easier to position the O-ring over the nozzle 210.

As shown in FIG. 3, rather than abutting the end of the nozzle, O-ring 224 surrounds at least a portion of the nozzle to provide a radial seal with the nozzle. This arrangement reduces potential compression and rotation of the O-ring, reducing potential damage to the O-ring while providing an improved seal. In addition, nozzle collar 218 directly abuts a wall of the manifold on one side and is biased downwardly on the other side by the spring washer 220. This arrangement can reduce variability in vertical alignment of the nozzle with the tip of the air shroud 202.

The nozzle 210 can have a distal portion that extends from one side of the nozzle collar 218 to a first end (i.e., a distal or exit end) and a proximal portion that extends from the other side of the nozzle collar 218 towards a second end (i.e., a proximal or entrance end).

The portion of the nozzle 210 that is contact with the manifold is illustrated as length L1 in FIG. 3. Preferably, this length is at least 20% of the length of the portion of the nozzle 210 that extends from nozzle collar 218 to the air shroud 202. In other embodiments, L1 can be at least 30% or at least 40% of the length L2. In some embodiments, the length L1 is between 20% and 80% or between 30% and 70% of the length L2.

Another sealing member 228 (e.g., a silicone O-ring) can be placed over a manifold thread 230, or extending portion, adjacent a manifold collar 232. The manifold 206 can be received into the wand body 216 as shown in FIG. 3, such as by engaging opposing threaded portions. In some embodiments, adjacent surfaces can be sized to come into contact to restrict an amount of pressure applied on the sealing member 228. For example, in some embodiments, opposing faces of the manifold collar 232 and wand body 216 can come into contact with each other to restrict further relative movement (e.g., by causing the face on the manifold collar to "bottom out" on the wand body face). The seal formed by the sealing member 228 can restrict air from escaping between the two parts and provide a consistent concentric alignment of the manifold within the wand body.

Figure 6A:
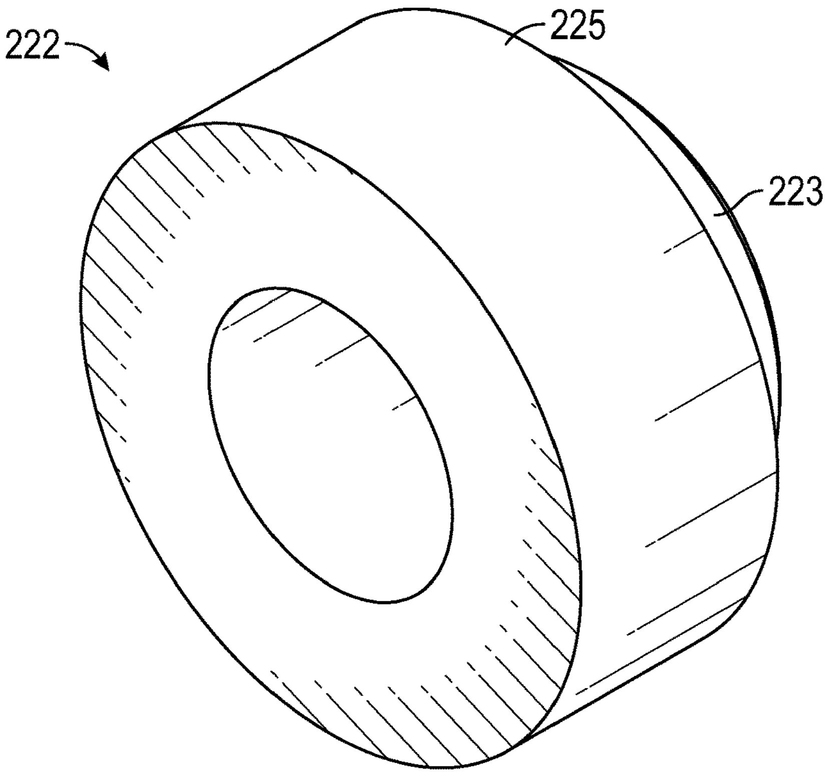
FIGS. 6A and 6B show an exemplary gland end of a flash nozzle assembly.
Figure 6B:
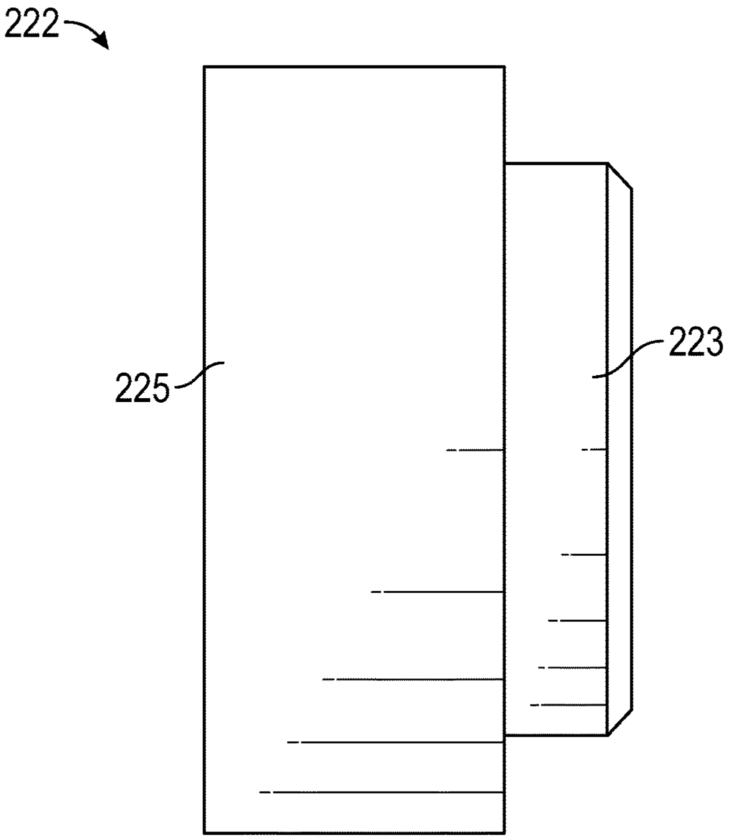

The use of gland end 222 facilitates easier insertion of the temperature- and solvent-resistant O-ring 224. To ensure the O-ring 224 remains in the desired position, spring washer 220 puts tension on gland end 222 to maintain the position of both gland end 222 and nozzle 210. In addition, the L-shape of the gland end 222 allows a portion of the gland end 222 to extend into the gland, fully encasing the O-ring 224 in the gland and restricting movement of the O-ring 224 out of the gland and negatively impacting the radial seal. FIGS. 6A and 6B show an exemplary gland end 222 in more detail, including a concentric extending portion 223 which extends from the main body 225 to provide the L-shape in the cross-sectional view shown in FIG. 3.

The fit and design of the connection between the gland end 222 and inner tube 226 in the wand body 216, as shown in FIG. 3, provide a robust and highly-repeatable connection for seal and nozzle alignment, which advantageously removes operator variability and improves the ease of assembly. In addition, the thickness of the gland end, in conjunction with the spring washer ensures there are no gaps and the nozzle, O-ring, and gland end remain in their desired positions.

Figure 7A:
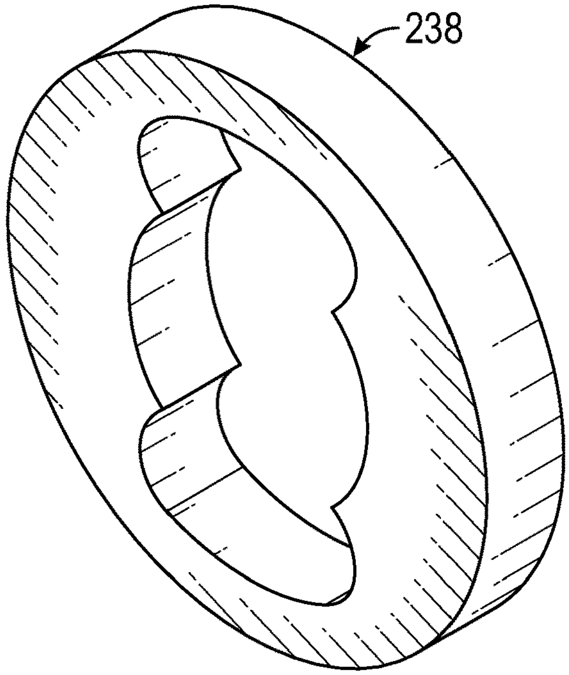
FIGS. 7A and 7B show an exemplary centering disk of a flash nozzle assembly.
Figure 7B:
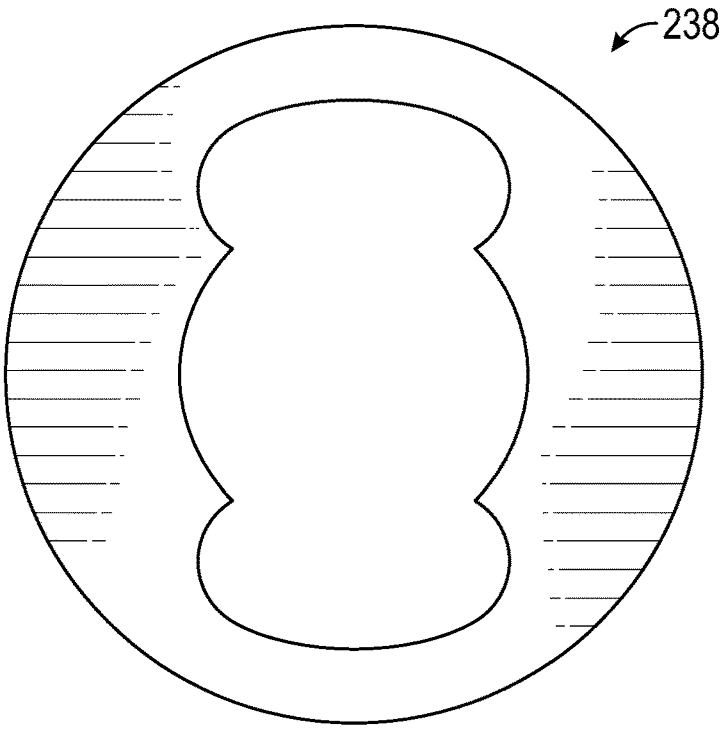

Referring again to FIG. 3, a boss seal fitting 236 can be coupled to the inner tube 226 (e.g., by welding) to connect the inner tube 226 to the wand 216 with the threaded fitting. In some embodiments, a centering disk 238 can also be secured to the inner tube 226 (e.g., by welding) to provide improved concentric alignment. FIGS. 7A and 7B show an exemplary centering disk 238 in more detail. The cylindrical centering disk 238 comprises a central opening 239 to receive the inner tube 226 and one or more slots 241 extending from the central opening 239 for the sweep gas to pass through.

In some embodiments, the boss seal connection on either side of the wand can be the same, making the connection of the inner tube 226 and manifold 206 is independent of wand orientation.

Figure 8:
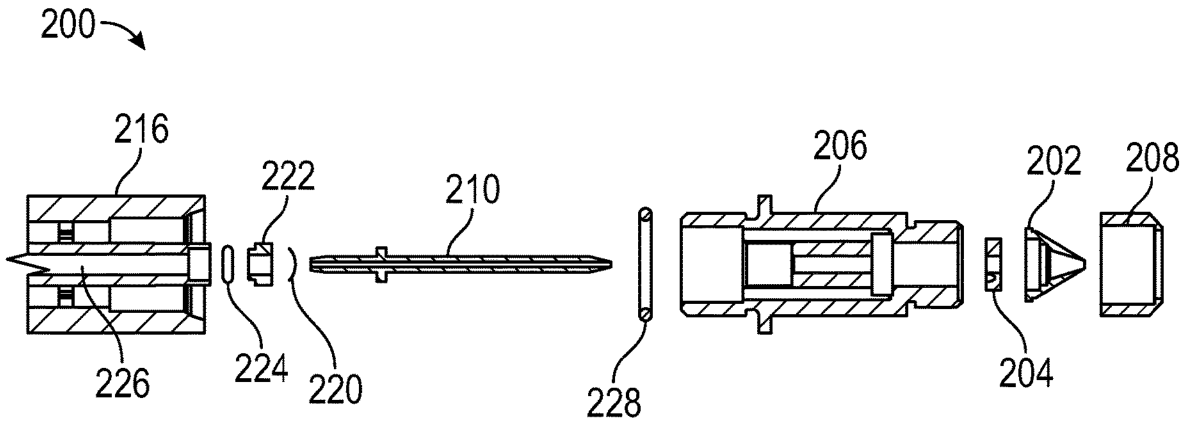
FIG. 8 illustrates an exploded view of the nozzle assembly shown in FIG. 3.

FIG. 8 illustrates an exploded view of the nozzle assembly shown in FIG. 3. As can be seen from FIG. 8, an exemplary assembly method can include the following steps. The swirl insert 204 can be positioned in the air shroud 202, and air shroud 202 can be pressed into the manifold 206. The shroud nut 208 can be tightened (e.g., hand-tightened). O-ring 228 (e.g., a silicone AS568-908 O-ring) can be rolled over the manifold threads. The spring washer 220 and the gland end 222 can be placed over the short end of the nozzle 210 with the flat side of the gland end 222 facing the spring washer 220. The nozzle 210 can then be positioned it into the manifold 206, pressing gently until it stops, which ensures that the nozzle tip is positioned as desired, e.g., flush with the tip of the air shroud 202. As used herein, the term "flush" refers to two surfaces that are completely or substantially level with one another.

An O-ring (e.g., Kalrez AS568-006) can be pressed into the groove (gland) in the inner tube of the wand body, and pressure applied as needed to seat properly. The O-ring is desirably evenly distributed in the groove (gland) and isn't angled or protruding. To help the O-ring slide into the gland easier, a lubricant, such as ethanol, can be used. Finally, the manifold/nozzle assembly can be threaded into the wand body 216 until it bottoms out. In this orientation, the flat metal surface below the O-ring of the manifold preferably contacts the metal surface of the wand body.

Figure 9:
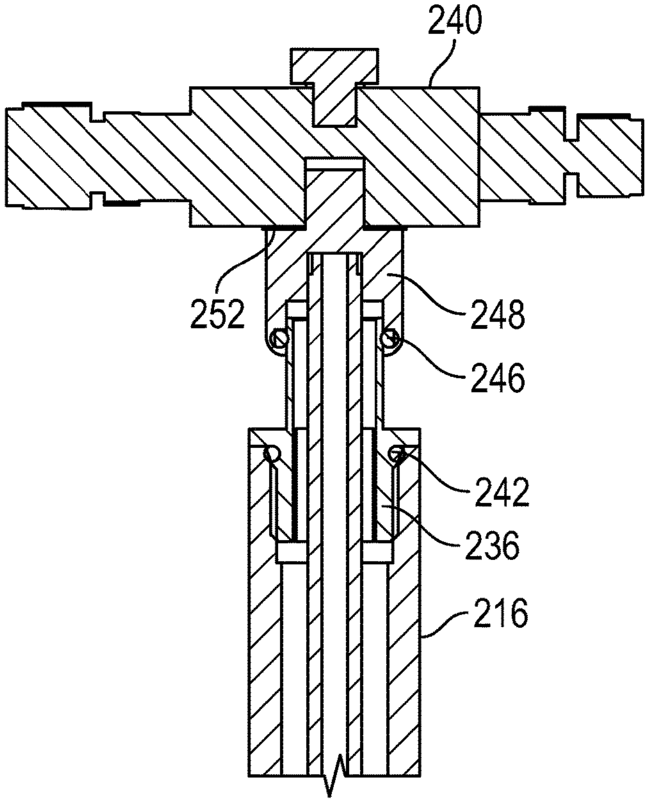
FIG. 9 illustrates an exemplary top connection of the nozzle assembly to an air-liquid manifold.
Figure 10:
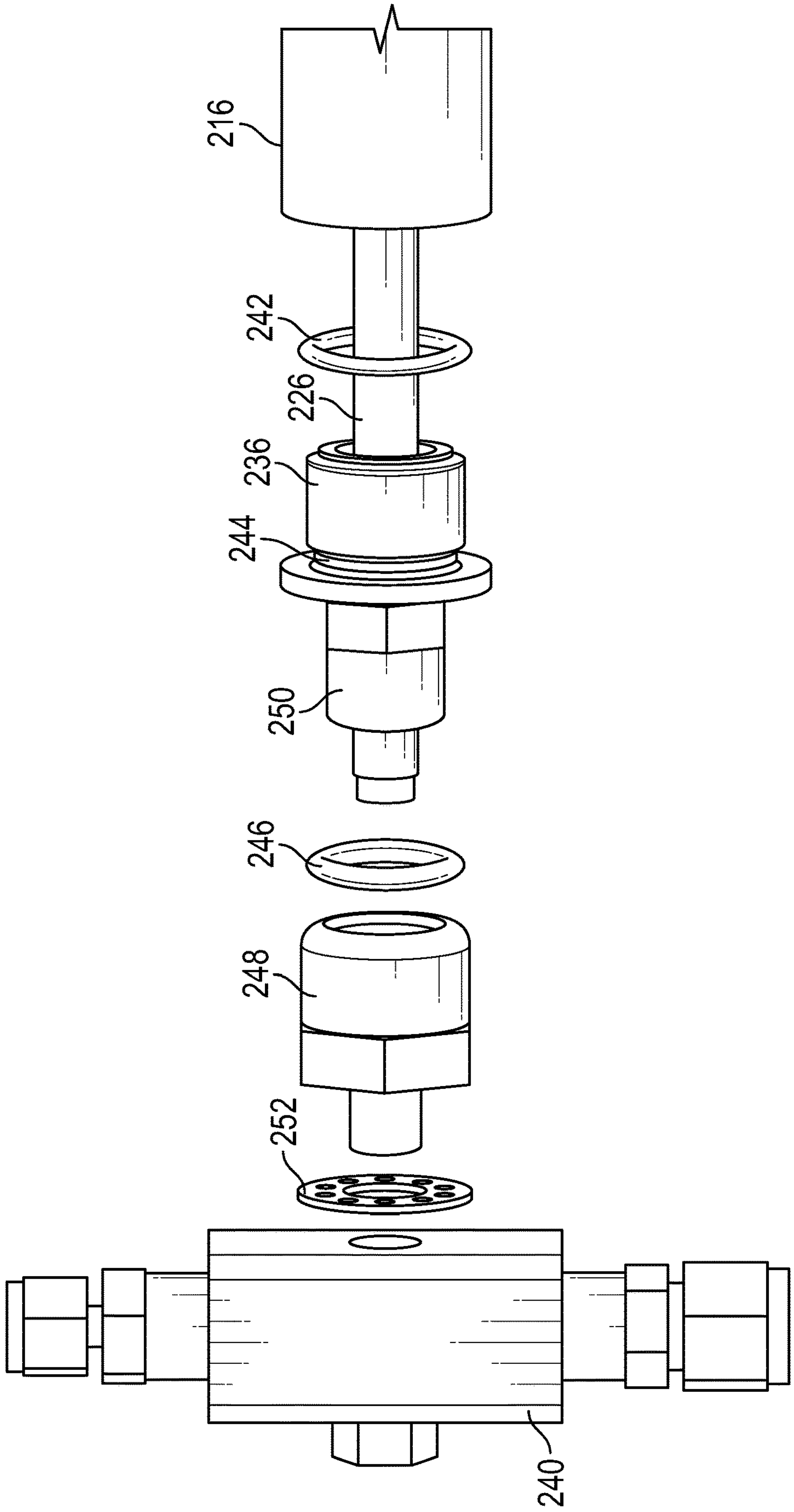
FIG. 10 illustrates an exploded view of the exemplary top connection shown in FIG. 9.

FIG. 9 illustrates an exemplary top connection of the nozzle assembly 200 to an air-liquid manifold 240, and FIG. 10 illustrates an exploded view of this section of the nozzle assembly. Another O-ring 242 (e.g., a silicone AS568-908) is positioned over threads of the boss seal fitting 236 and into the groove 244. The boss seal fitting 236 can be threated into the wand 216 until it bottoms out. The flat metal surface above the O-ring on the threaded inner tube preferably contacts the metal surface of the wand. Another O-ring 246 (e.g., a silicone AS568-113 O-ring) can be positioned in a groove inside a nozzle wand adapter 248. The nozzle wand adapter 248 can then be threaded onto an end portion 250 of the threaded inner tube.

A gasket 252 (e.g., a Teflon® gasket) can be placed onto the nozzle wand adapter 248, and the air-liquid manifold 240 can be threaded onto the nozzle wand adapter 248.

Once assembled, fluid at high temperature and pressure can flow through the inner passageway of the inner tube 226 and into the capillary nozzle 210. Upon exiting the nozzle 210, the fluid rapidly expands and undergoes a phase change (i.e., the fluid "flash" atomizes as discussed herein). Concurrently, a sheath gas (e.g., nitrogen or other suitable gas) flows through the outer passageway between the inner tube 226 and wand 216, into the manifold 206, through the swirl insert 204, and exits the air shroud 202 in the vicinity of the tip of the nozzle 210 to provide improved atomization and prevent buildup of material at the tip of the nozzle 210.

The different structures disclosed herein can vary in their dimensions. For example, the wand body disclosed herein can vary in length from 10 inches to 35 inches, or from 10 inches to 30 inches, or from 10 inches to 20 inches, or from 20 inches to 30 inches, depending on the particular application. The nozzle length and diameters can also vary. For example, the nozzle overall length can vary from 3.5 cm to 11 cm, or from 5 cm to 9 cm, or from 5.5 to 7 cm. In some embodiments, the nozzle inner diameter can vary from 100 μm to 1000 μm, or from 150 μm to 900 μm, or from 150 μm to 200 μm, or from 350 μm to 850 μm, depending on the particular application. The nozzle inner diameter may vary along its length. For example, in some embodiments, a larger inner diameter portion can be at a proximal end and a smaller inner diameter portion can extend to the distal end. For embodiments in which the inner diameter steps down to a smaller inner diameter, the smaller inner diameter portion can have a length of 3 cm up to 11 cm. Smaller nozzle lengths may, of course, require modifications to other portions of the system. For example, as one of ordinary skill in the art reading this disclosure would understand, a length of the manifold 206 can be reduced to accommodate a shorter nozzle.

Figure 11:
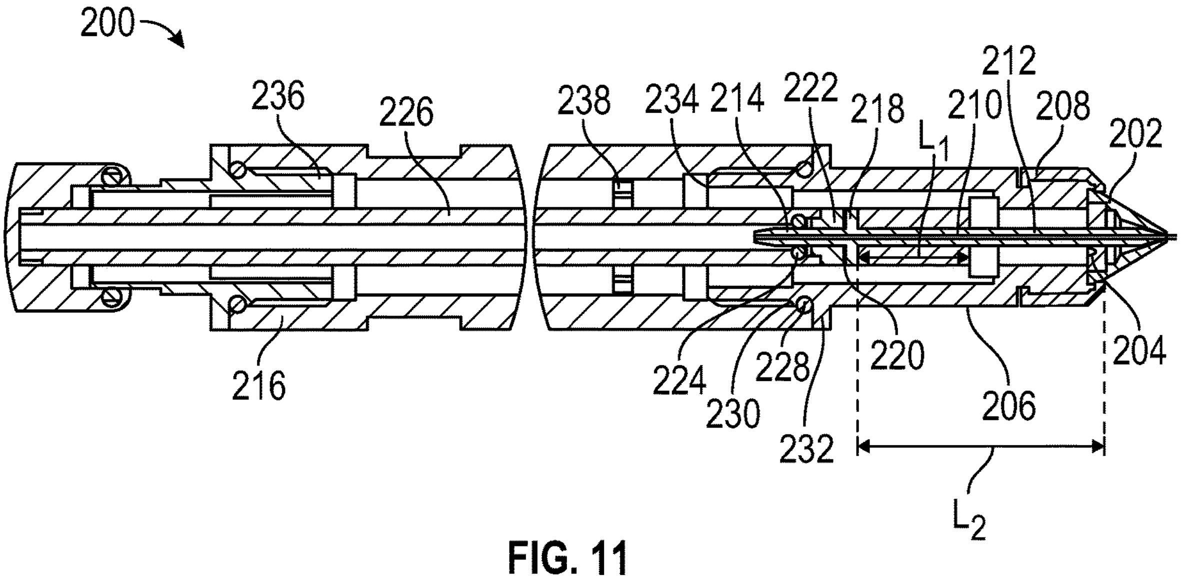
FIG. 11 is an illustration of another exemplary flash nozzle assembly.

As discussed above, the distal nozzle portion can extend through the air-cap passageway and the distal opening of the air cap can be flush with the nozzle distal end or, in other embodiments, the distal nozzle portion can extend beyond the distal opening of the air cap. FIG. 11 illustrates the flash nozzle assembly 200 shown in FIG. 3. However, instead of being flush with the distal opening of the air cap, the nozzle distal end extends outward from the distal opening of the air cap.

The amount that the nozzle extends outward from the distal opening can vary. In some embodiments, the amount that the nozzle distal end extends outward from the distal opening varies from 0 (e.g., flush) to 3 mm, or in other embodiments, from 0 (e.g., flush) to 2 mm, or in yet other embodiments from 0 (e.g., flush) to 1 mm. In another embodiment, the nozzle distal end extends outward from the distal opening by 0.5 mm to 1.5 mm.

Exemplary Spray Formulations and Feed Suspensions

The systems and methods described herein can be used with a variety of feed stocks. In one embodiment, the feed stock is a feed suspension that comprises an active agent, a matrix material, and a solvent, wherein at least a portion of the active agent, a portion of the matrix material, or a portion of both active agent and matrix material are suspended or not dissolved in the solvent. In some embodiments, the solvent can be an organic solvent. In one embodiment, the feed suspension consists essentially of an active agent, a matrix material, and a solvent. In still another embodiment, the feed suspension consists of an active agent, a matrix material, and a solvent. In yet another embodiment, the feed suspension consists of particles of active agent suspended in a solution of matrix material dissolved in the solvent. It will be recognized that in such feed suspensions, a portion of the active agent and the matrix material may dissolve up to their solubility limits at the temperature of the feed suspension.

As used herein, the term "active agent" refers to a drug, medicament, pharmaceutical, therapeutic agent, nutraceutical, nutrient, or other compound. The active agent may be a "small molecule," generally having a molecular weight of 2000 Daltons or less. The active agent may also be a "biological active." Biological actives include proteins, antibodies, antibody fragments, peptides, oligoneucleotides, vaccines, and various derivatives of such materials. In one embodiment, the active agent is a small molecule. In another embodiment, the active agent is a biological active. In still another embodiment, the active agent is a mixture of a small molecule and a biological active. In yet another embodiment, the compositions made by certain of the disclosed processes comprise two or more active agents.

As used herein, the term "solvent" refers to water or other compounds, such as an organic compound, that can be used to dissolve or suspend the solute. Suitable solvents can include water; alcohols such as methanol, ethanol, n-propanol, isopropanol, and butanol; ketones such as acetone, methyl ethyl ketone and methyl isobutyl ketone; esters such as ethyl acetate and propyl acetate; and various other solvents, such as tetrahydrofuran, acetonitrile, methylene chloride, toluene, and 1,1,1-trichloroethane. Lower volatility solvents such as dimethylacetamide or dimethylsulfoxide can also be used, generally in combination with a volatile solvent. Mixtures of solvents, such as 50% methanol and 50% acetone, can also be used, as can mixtures with water.

As used herein, the term "organic solvent" means a solvent that is an organic compound. In one embodiment, the solvent is volatile, having an ambient-pressure boiling point of 150° C. or less. In another embodiment, the solvent has an ambient-pressure boiling point of 100° C. or less. Suitable solvents include alcohols such as methanol, ethanol, n-propanol, isopropanol, and butanol; ketones such as acetone, methyl ethyl ketone and methyl isobutyl ketone; esters such as ethyl acetate and propyl acetate; and various other solvents, such as tetrahydrofuran, acetonitrile, methylene chloride, toluene, and 1,1,1-trichloroethane. Lower volatility solvents such as dimethylacetamide or dimethylsulfoxide can also be used, generally in combination with a volatile solvent. Mixtures of solvents, such as 50% methanol and 50% acetone, can also be used, as can mixtures with water. In one embodiment, the organic solvent contains less than 50 wt % water. In another embodiment, the organic solvent contains less than 25 wt % water. In still another embodiment, the organic solvent contains less than 10 wt % water. In yet another embodiment, the organic solvent contains less than 5 wt % water. In another embodiment, the organic solvent contains essentially no water.

In some embodiments, the feed suspension can further include an excipient. As used herein, the term "excipient" means a substance that may be beneficial to include in a composition with an active agent. The term "excipient" includes inert substances as well as functional excipients that may result in beneficial properties of the composition. Exemplary excipients include but are not limited to polymers, sugars, salts, buffers, fats, fillers, disintegrating agents, binders, surfactants, high surface area substrates, flavorants, carriers, matrix materials, and so forth.

Exemplary Products

The systems and methods described herein can be used to form a variety of spray-dried products.

For example, the particles may be of any desired size. In one embodiment, the particles have an average diameter ranging from 0.5 μm to 500 μm. In another embodiment, the particles have a diameter ranging from 0.5 μm to 100 μm. In another embodiment, the particles have an average diameter of greater than 10 μm. In still another embodiment, the particles have an average diameter of greater than 20 μm. In still another embodiment, the particles have an average diameter of greater than 30 μm. In yet another embodiment, the particles have a mass median aerodynamic diameter ranging from 0.5 μm to 10 μm. In still another embodiment, the particles have a mass median aerodynamic diameter ranging from 1 μm to 5 μm.

In one embodiment, the plurality of particles produced by the processes and in the apparatuses disclosed herein are inhalable particles that can be inhaled by a subject (e.g., human or animal) As used herein, the term "inhalation" refers to delivery to a subject through the mouth or nose. In one embodiment, the spray-dried particles are delivered to the "upper airways." The term "upper airways" refers to delivery to nasal, oral, pharyngeal, and laryngeal passages, including the nose, mouth, nasopharynx, oropharynx, and larynx. In another embodiment, the spray-dried particles are delivered to the "lower airways." The term "lower airways" refers to delivery to the trachea, bronchi, bronchioles, alveolar ducts, alveolar sacs, and alveoli.

In one embodiment, the particles have a mass median aerodynamic diameter (MMAD) of about 5 to 100 μm. In another embodiment, the particles have a MMAD of about 10 to 70 μm. Mass median aerodynamic diameter (MMAD) is the median aerodynamic diameter based on particle mass. In a sample of particles, 50% of the particles by weight will have an aerodynamic diameter greater than the MMAD, and 50% of the particles by weight will have an aerodynamic diameter smaller than the MMAD. In yet another embodiment, the particles have an average diameter of 50 μm, or even 40 μm, or 30 μm. In other embodiments, the particles can have an MMAD of less than about 20 μm, or even less than about 10 μm. In another embodiment, the particles have a MMAD ranging from 0.5 μm to 10 μm. In still another embodiment, the particles have a MMAD ranging from 1 μm to 5 μm.

In one embodiment, the particles are intended for inhalation and have a MMAD of 0.5 to 100 μm. In another embodiment, the particles are intended for inhalation and have a MMAD of 0.5 to 70 μm.

In one embodiment, the particles are intended for delivery to the upper airways, and have a MMAD of greater than 10 μm. In another embodiment, the particles are intended for delivery to the upper airways and have a MMAD of 10 to 100 μm, and wherein the weight fraction of particles having an aerodynamic diameter of less than 10 μm is less than 0.1. In another embodiment, the particles are intended for delivery to the upper airways and have a MMAD of 10 to 70 μm, and the weight fraction of particles having an aerodynamic diameter of less than 10 μm is less than 0.1.

In another embodiment, the particles are intended for delivery to the lower airways, and have a MMAD of less than 10 μm. In one embodiment, the particles are intended for delivery to the lower airways, and have a MMAD of 0.5 to 10 μm, and the weight fraction of particles having an aerodynamic diameter of greater than 10 μm is less than 0.1. In another embodiment, the particles are intended for delivery to the lower airways, and have a MMAD of 0.5 to 7 μm, and the weight fraction of particles having an aerodynamic diameter of greater than 7 μm is less than 0.1.

In one embodiment, the concentration of solvent remaining in the particles when they are collected (that is, the concentration of residual solvent) is less than 10 wt % based on the total weight of the particles. In another embodiment, the concentration of residual solvent in the particles when they are collected is less than 5 wt %. In yet another embodiment, the concentration of residual solvent in the particles is less than 3 wt %. In another embodiment, a drying process subsequent to the spray-drying process may be used to remove residual solvent from the particles. Exemplary processes include tray drying, fluid-bed drying, vacuum drying, and the drying processes described in WO2006/079921 and WO2008/012617, incorporated herein by reference.

The nozzle assemblies and systems disclosed herein can provide improvements in assembling and operating spray drying system by providing nozzle assemblies that are easier and more consistent to manufacture, improved concentric alignment of nozzles, including reducing eccentric and vertical alignment of the tip of a nozzle within an air shroud, and increased robustness that can better withstand the elevated temperatures and/or pressures of a spray solution.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

The invention claimed is:

1. A nozzle assembly comprising:

a nozzle having a nozzle distal end, a nozzle proximal end, a nozzle collar located between the nozzle distal end and the nozzle proximal end, a first central passageway, a nozzle distal portion extending from a first side of the nozzle collar to the nozzle distal end, and a nozzle proximal portion extending from a second side of the nozzle collar to the nozzle proximal end;

a manifold having a manifold distal end, a manifold proximal end, a second central passageway through which the nozzle is received, at least one manifold sweep gas passageway, and an internal shoulder portion that engages with the first side of the nozzle collar to restrict a distal movement of the nozzle relative to the manifold;

a wand body having a wand body distal end, a wand body proximal end, an inner tube with a groove in an enlarged portion of the inner tube at the wand body distal end, and at least one wand body sweep gas passageway; and a first sealing member positioned in the groove of the inner tube, wherein at least a portion of the nozzle proximal portion extends into the inner tube of the wand body with the first sealing member forming a radial seal between an outer surface of the nozzle proximal portion and the inner tube of the wand body.

2. The nozzle assembly of claim 1, further comprising a gland end with a proximal portion that extends into the enlarged portion of the inner tube and a distal portion that engages with the second side of the nozzle collar to restrict a proximal movement of the nozzle relative to the wand body.

3. The nozzle assembly of claim 2, further comprising a biasing member that is positioned between the distal portion of the gland end and the second side of the nozzle collar, wherein the biasing member biases the first side of the nozzle collar against the internal shoulder portion of the manifold.

4. The nozzle assembly of claim 1, further comprising:

an air cap having a proximal opening, a distal opening, and an air-cap passageway that tapers from the proximal opening to the distal opening, wherein the distal nozzle portion extends through the air-cap passageway and the distal opening of the air cap is flush with the nozzle distal end.

5. The nozzle assembly of claim 1, further comprising:
an air cap having a proximal opening, a distal opening, and an air-cap passageway that tapers from the proximal opening to the distal opening,
wherein the distal nozzle portion extends through the air-cap passageway and the nozzle distal end extends outwardly from the distal opening of the air cap.

6. The nozzle assembly of claim 5, further comprising:
a swirl insert positioned between the manifold and air cap, the swirl insert comprising a nozzle passageway through which the nozzle extends and one or more additional passageways for receiving a sweep gas,
wherein the one or more additional passageways are formed at an angle relative to the nozzle passageway.

7. The nozzle assembly of claim 6, wherein the air cap is sized to receive the swirl insert within the proximal opening.

8. The nozzle assembly of claim 5, further comprising:
an air cap nut that extends over the air cap to secure the air cap to the manifold distal end.

9. The nozzle assembly of claim 5, wherein the second central passageway is defined by an interior surface of the manifold that extends from the internal shoulder portion of the manifold to an air-channel connection within the manifold, a length of the interior surface of the manifold being at least 20% of a length of a portion of the nozzle that extends from the nozzle collar to the air cap.

10. The nozzle assembly of claim 9, wherein the air-channel connection comprises a cylindrical groove cutout.

11. The nozzle assembly of claim 1, wherein the manifold further comprises a manifold collar, the manifold proximal end extends into the wand body so that the manifold proximal end surrounds a portion of the inner tube of the wand body, and a proximal side of the manifold collar engages with a distal surface of the wand body.

12. The nozzle assembly of claim 11, further comprising a second sealing member, wherein the second sealing member is disposed in a groove formed in the proximal side of the manifold collar.

13. The nozzle assembly of claim 1, further comprising a centering disk with a central opening and one or more slots radially outward of the central opening, wherein the centering disk is secured to the inner tube with the inner tube positioned in the central opening.

14. The nozzle assembly of claim 1, wherein the nozzle proximal end is chamfered.

15. A nozzle assembly comprising:
a nozzle having a nozzle distal end, a nozzle proximal end, a nozzle collar located between the nozzle distal end and the nozzle proximal end, a first central passageway, a nozzle distal portion extending from a first side of the nozzle collar to the nozzle distal end, and a nozzle proximal portion extending from a second side of the nozzle collar to the nozzle proximal end;
a wand body having a wand body distal end, a wand body proximal end, an inner tube with a groove in an enlarged portion of the inner tube at the wand body distal end, and at least one wand body sweep gas passageway;
a sealing member positioned in the groove of the inner tube and at least a portion of the nozzle proximal portion extending through the sealing member into the inner tube of the wand body;
a gland end with a proximal portion that extends into the enlarged portion of the inner tube and a distal portion that engages with the second side of the nozzle collar to restrict a proximal movement of the nozzle relative to the wand body.

16. The nozzle assembly of claim 15, wherein the nozzle proximal end is chamfered.

17. The nozzle assembly of claim 15, further comprising a biasing member that is positioned between the distal portion of the gland end and the second side of the nozzle collar, wherein the biasing member biases the first side of the nozzle collar away from the wand body.

18. The nozzle assembly of claim 15, further comprising a manifold having a manifold distal end, a manifold proximal end, a second central passageway through which the nozzle is received, at least one manifold sweep gas passageway, and an internal shoulder portion that engages with the first side of the nozzle collar to restrict a distal movement of the nozzle relative to the manifold.

19. The nozzle assembly of claim 18, further comprising:
an air cap having a proximal opening, a distal opening, and an air-cap passageway that tapers from the proximal opening to the distal opening;
a swirl insert received in air cap, the swirl insert comprising a nozzle passageway through which the nozzle extends and one or more additional angled passageways; and
an air cap nut that extends over the air cap to secure the air cap to the distal end of the manifold.

20. The nozzle assembly of claim 19, wherein the distal nozzle portion extends through the air-cap passageway and the distal opening of the air cap is flush with the nozzle distal end.

21. The nozzle assembly of claim 19, wherein the distal nozzle portion extends through the air-cap passageway and the nozzle distal end extends outward from the distal opening of the air cap.

* * * * *